United States Patent
Fösel et al.

(10) Patent No.: US 12,038,212 B2
(45) Date of Patent: Jul. 16, 2024

(54) CALIBRATION METHOD OF REFRIGERANT SATURATION TEMPERATURE IN A REFRIGERATION SYSTEM, A CONTROLLER FOR APPLYING SUCH A METHOD AND A COOLING MACHINE

(71) Applicant: MAERSK CONTAINER INDUSTRY A/S, Tinglev (DK)

(72) Inventors: Georg Fösel, Tinglev (DK); Poul Kim Madsen, Tinglev (DK); Ole Thøgersen, Tinglev (DK)

(73) Assignee: MAERSK CONTAINER INDUSTRY A/S, Tinglev (DK)

( * ) Notice: Subject to any disclaimer, the term of this patent is extended or adjusted under 35 U.S.C. 154(b) by 366 days.

(21) Appl. No.: 17/423,206

(22) PCT Filed: Jan. 14, 2020

(86) PCT No.: PCT/EP2020/050797
§ 371 (c)(1),
(2) Date: Jul. 15, 2021

(87) PCT Pub. No.: WO2020/148270
PCT Pub. Date: Jul. 23, 2020

(65) Prior Publication Data
US 2022/0107125 A1  Apr. 7, 2022

(30) Foreign Application Priority Data
Jan. 15, 2019 (DK) .......................... PA 2019 70027

(51) Int. Cl.
F25B 49/02 (2006.01)
F25B 9/00 (2006.01)
F25D 11/00 (2006.01)

(52) U.S. Cl.
CPC ................ F25B 49/02 (2013.01); F25B 9/00 (2013.01); F25D 11/003 (2013.01);
(Continued)

(58) Field of Classification Search
CPC ........ F36B 9/00; F36B 49/02; F36B 2400/08; F36B 2400/121; F36B 2500/19;
(Continued)

(56) References Cited

U.S. PATENT DOCUMENTS 4,819,443 A   4/1989  Watanabe et al.
5,158,747 A  10/1992  Manz et al.
(Continued)

FOREIGN PATENT DOCUMENTS

CA   2783042 A1   1/2014
CN   1121162 A    4/1996
(Continued)

OTHER PUBLICATIONS

Chinese Office Action dated Oct. 27, 2022 for Chinese Application No. 202080020981.X.
(Continued)

*Primary Examiner* — Jonathan Bradford
(74) *Attorney, Agent, or Firm* — EIP US LLP

(57) ABSTRACT

A method of determining a refrigerant or a composition of refrigerants in a refrigeration system comprising an expansion valve, an evaporator, one or more evaporator fans, a condenser, one or more condenser fans one or more temperature sensors, one or more pressure sensors, a compressor, and a controller for controlling the refrigeration system, the controller comprising a memory, the expansion valve, the evaporator and the compressor being fluidly interconnected in a refrigerant path having refrigerant flowing therein, comprising the steps of: a) Running a test run and read out values from one or more of the sensors; b) Deter-
(Continued)

Figure 1:
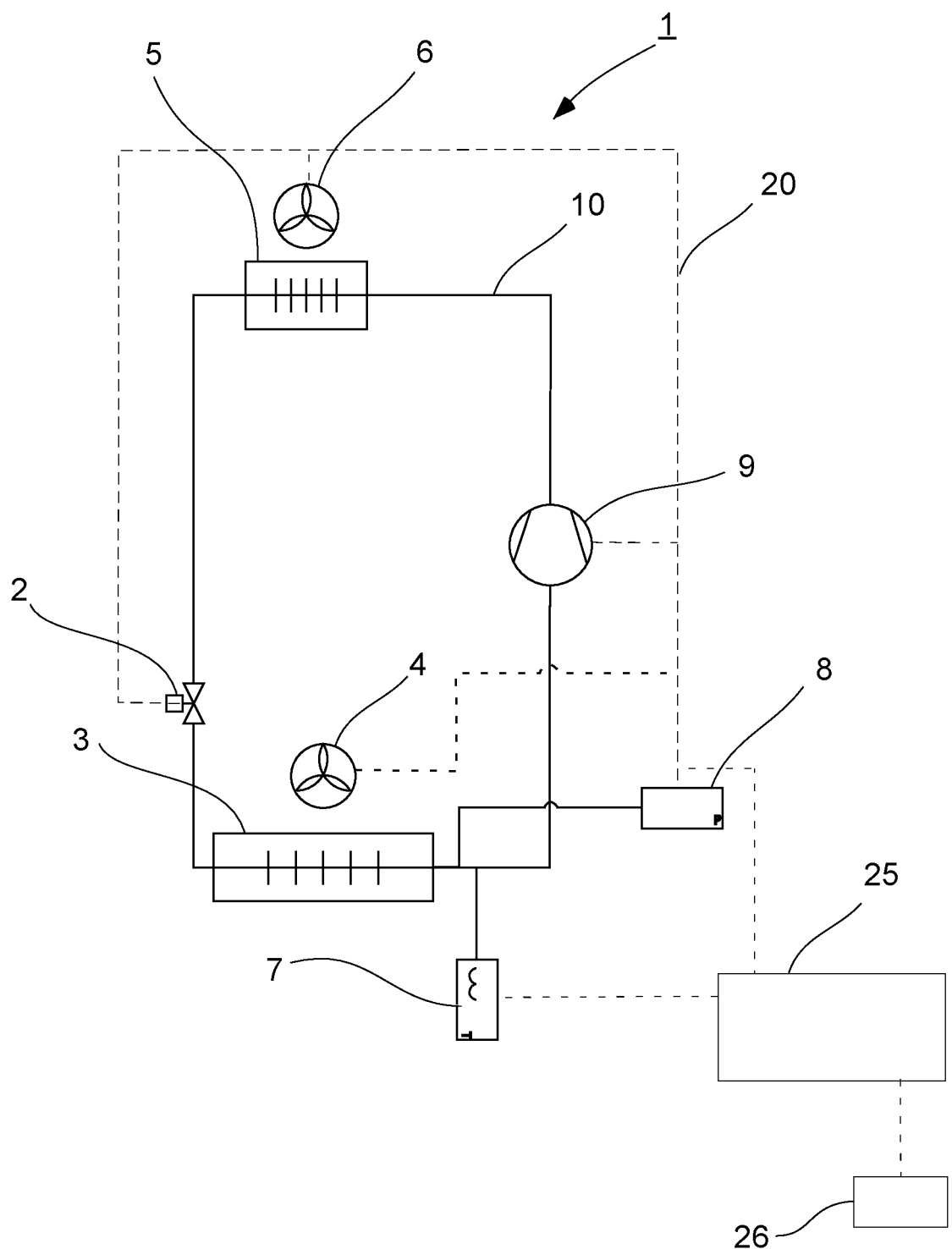

mining a composition by the result of step a; and c) Adjusting the refrigeration system in relation to the composition determined by step b. Also disclosed is a controller for controlling a refrigeration system and a cooling machine in a reefer container.

17 Claims, 4 Drawing Sheets

(52) U.S. Cl.
CPC ..... *F25B 2400/08* (2013.01); *F25B 2400/121* (2013.01); *F25B 2500/19* (2013.01); *F25B 2700/1933* (2013.01); *F25B 2700/21151* (2013.01)

(58) Field of Classification Search
CPC .... F36B 2700/1933; F36B 2700/21151; F25D 11/003
See application file for complete search history.

(56) References Cited

U.S. PATENT DOCUMENTS

| | | | |
|---|---|---|---|
| 5,181,391 | A | 1/1993 | Manz |
| 5,820,262 | A | 10/1998 | Lechner |
| 9,456,671 | B2 * | 10/2016 | Crowhurst .............. A45B 9/04 |
| 2004/0149912 | A1 | 8/2004 | Nomura et al. |
| 2011/0222576 | A1 | 9/2011 | Vonsild et al. |
| 2012/0291462 | A1 | 11/2012 | Verma et al. |
| 2013/0152613 | A1 | 6/2013 | Yamashita |
| 2014/0090409 | A1 | 4/2014 | Yamashita et al. |
| 2015/0075194 | A1 | 3/2015 | Ishimura et al. |

FOREIGN PATENT DOCUMENTS

| | | |
|---|---|---|
| CN | 1208841 A | 2/1999 |
| CN | 1274416 A | 11/2000 |
| CN | 101128707 A | 2/2008 |
| CN | 102144136 A | 8/2011 |
| CN | 103250013 A | 8/2013 |
| CN | 106440586 A | 2/2017 |
| DE | 102012215817 A1 | 3/2014 |
| EP | 0693663 A2 | 1/1996 |
| EP | 1965158 A3 | 6/2009 |
| EP | 2878899 A1 | 6/2015 |
| EP | 2331891 B1 | 10/2015 |
| JP | 2005155929 A | 6/2005 |
| JP | 2008202911 A | 9/2008 |

OTHER PUBLICATIONS

International Search Report and Written Opinion dated Mar. 31, 2020 for International PCT Application No. PCT/EP2020/050797.
Danish Search report dated Jul. 29, 2019 for Danish Application No. PA 2019 70027.
Danish Search report dated Oct. 8, 2020 for Danish Application No. PA 2019 70027.
CheGuide, "Curve fitting data to an Antoine Equation", Aug. 9, 2015, Retrieved from https://cheguide.com/antoine_eqn.html.
International Preliminary Report of Patentability dated Jun. 16, 2021 for International PCT Application No. PCT/EP2020/050797.

* cited by examiner

CALIBRATION METHOD OF REFRIGERANT SATURATION TEMPERATURE IN A REFRIGERATION SYSTEM, A CONTROLLER FOR APPLYING SUCH A METHOD AND A COOLING MACHINE

CROSS-REFERENCE TO RELATED APPLICATIONS

This application is a 371 of International Application No. PCT/EP2020/050797, filed Jan. 14, 2020, which claims priority to Danish Application No. PA 2019 70027, filed Jan. 15, 2019 under 35 U.S.C. § 119(a). Each of the above-referenced patent applications is incorporated by reference in its entirety.

The invention relates to a method of determining a refrigerant or a composition of refrigerants in a refrigeration system comprising an expansion valve, an evaporator, one or more evaporator fans, a condenser one or more condenser fans one or more temperature sensors, one or more pressure sensors, a compressor, and a controller for controlling the refrigeration system, the controller comprising a memory, the expansion valve, the evaporator and the compressor being fluidly interconnected in a refrigerant path having refrigerant flowing therein.

The invention also relates to a controller for controlling a refrigeration system, the controller comprising a memory, the refrigeration system comprising an expansion valve, an evaporator, one or more evaporator fans, a condenser, one or more condenser fans one or more temperature sensors, one or more pressure sensors, a compressor, the expansion valve, the evaporator and the compressor being fluidly interconnected in a refrigerant path having a refrigerant or a composition of refrigerants flowing therein.

The invention further relates to a cooling machine in a reefer container e.g. in a truck, a railway container, an intermodal container or a shipping container comprising a refrigeration system comprising an expansion valve, an evaporator, one or more evaporator fans, a condenser, one or more condenser fans one or more temperature sensors, one or more pressure sensors, a compressor, and a controller for controlling the refrigeration system, the controller comprising a memory, the expansion valve, the evaporator and the compressor being fluidly interconnected in a refrigerant path having refrigerant flowing therein.

Cooling systems known as vapour compression systems used for example in refrigeration systems e.g. in a truck, a railway container, an intermodal container or a shipping container are commonly designed as dry-expansion systems.

In dry expansion systems, superheat is used as a control parameter to optimize capacity and performance of the system.

The superheat parameter is a value, calculated based on refrigerant properties, pressure, and temperature measurement at pre-defined points in the refrigeration system, typically at an evaporator outlet of the refrigeration system. From measurement of the pressure, a saturated temperature of the refrigerant is calculated at dew-point, by use of equations describing relation between vapour pressure and temperature, such as a known Antoine equation.

Superheat can be defined as temperature difference between measured temperature at the evaporator outlet and the calculated saturation temperature from the pressure measurement.

From thermodynamic properties of single component and azeotropic refrigerants it is known, that vapour refrigerant cannot reach a superheat below 0° Kelvin, because the temperature remains constant for a given pressure when the refrigerant changes phase between liquid and vapour and vice versa.

For near azeotropic refrigerants, i.e. refrigerants that show a small temperature gradient during the phase change for a given pressure, the superheat will be, at minimum, close to 0° K or even negative.

In general, refrigeration plants benefit from lower levels of superheat with increased capacity and efficiency. To obtain and maintain a good capacity, efficiency and reliability of the system components, and the compressor, the superheat should be kept within recommended boundaries, depending on operating conditions.

As for all manufactured components, tolerances exist also on temperature sensors and pressure transmitters, which can further influence the calculated superheat and impact capacity, efficiency and/or reliability.

A desire to reach a more environmentally friendly solution has led to an overall attempt to phase-out of refrigerants with a high global warming potential (GWP).

Manufacturers of refrigeration plants have implemented new refrigerants with lower levels of GWP and in some circumstances, both old and new replacement refrigerant can be used on the same refrigeration system.

While standards such as EN 378-4 require that refrigerants shall not intentionally be mixed, this can happen unintended or intended and without knowledge to the refrigeration system manufacturer.

Uncertainty of which refrigerant or refrigeration mixture is present in the refrigeration system, will impact the thermodynamic properties of the fluid used and therefore impacts the level of actual superheat and causing possibly lower efficiency of the system.

Such uncertainty can be caused by use of other refrigerants than specified from manufacturer or from an unspecified mixing of refrigerants.

For example, the refrigerant R1234yf is considered a replacement for refrigerant R134a and has been adopted by the automotive industry despite the difference in safety classification. For other refrigeration systems it is a requirement to maintain the same safety classification as R134a. A possible solution is a refrigerant mixture of 44% R134a and 56% R1234yf known as R513A, which fulfills these requirements and has been adapted e.g. in the reefer industry.

As already mentioned, the Antoine equation is one method of calculating the vapour-pressure curves for refrigerants and has been adopted in microcontrollers because of its compact and therefore computational efficient formulation. In Equation 1, the general formula of the Antoine equation is shown, with which the saturated temperature of the refrigerant T (in ° C.) can be calculated based on the pressure measurement P (in bar) and refrigerant specific constants $a_0$, $a_1$ and $a_2$.

$$T = \frac{a_0}{\ln P + a_1} + a_2 \quad \text{(Eq. 1)}$$

Using refrigeration properties and mixture models from standard reference data, such as included in for example NIST Refprop (REFerence fluid PROPerties developed by the National Institute of Standards and Technology NIST), it is possible to calculate the specific parameters $a_0$, $a_1$ and $a_2$ for a refrigerant and for mixtures of refrigerant.

It is an aim to diminish or even eliminate influence from unknown refrigerants or unknown mixtures of refrigerant as well as influence from tolerances in sensors by calibrating refrigerant properties and/or sensors and/or transmitters in the system in relation to present refrigerant or mixture of refrigerant.

From EP2331891 B1, a method for calibrating a superheat sensor is known, the superheat sensor being arranged in a refrigeration system comprising an expansion valve, an evaporator and a compressor, the expansion valve, the evaporator, the superheat sensor and the compressor being fluidly interconnected in a refrigerant path having refrigerant flowing therein, the method comprising the steps of:

increasing an amount of liquid refrigerant in the evaporator,
monitoring one or more parameters, said parameter(s) reflecting a superheat value of the refrigerant,
allowing the value of each of said parameter(s) to change,
when the value(s) of the monitored parameter(s) reaches a substantially constant level, defining the superheat value corresponding to said substantially constant level to be SH=0, and
calibrating the superheat sensor in accordance with the defined SH=0 level.

When calibrating the superheat sensor, the amount of liquid refrigerant in the evaporator is initially increased. This may, e.g. be done by increasing an opening degree of the expansion valve, by decreasing a rotational speed of the compressor or by decreasing a secondary fluid flow across the evaporator.

An object of the invention is to determine a composition of refrigerant within a refrigeration system e.g. in a truck, a railway container, an intermodal container or a shipping container.

This is achieved by eliminating the uncertainties originating from a possible mixture of refrigerant by a method comprising the steps of:
a) Running a test run and read out values from one or more of the sensors;
b) Determining a composition by the result of step a; and
c) Adjusting the refrigeration system in relation to the composition determined by step b.

Hereby it is possible to determine a composition of refrigerant based on table values of Antoine parameters and compared to values from one or more sensors read out from a test run followed by an adjustment or calibration of the refrigeration system in relation to the composition of refrigerant determined by the result of the test run.

In an embodiment, a calibration point A is determined at a set-point temperature $T_{set}$ A of the refrigeration system, set to 20° C.+/−10° C.

In an embodiment, values of $T_{suc}$ A and $P_{suc}$ A, based on set-point temperature $T_{set}$ A, is stored in the memory of the controller.

In an embodiment, a calibration point B is determined at a set-point temperature $T_{set}$ B, set to 0° C.+/−10° C.

In an embodiment, values of $T_{suc}$ B and $P_{suc}$ B, based on set-point temperature $T_{set}$ B, is stored in the memory of the controller.

In an embodiment, a calibration point C is determined at a set-point temperature $T_{set}$ C, set to −20° C.+/−10° C.

In an embodiment, values of $T_{suc}$ C and $P_{suc}$ C, based on set-point temperature $T_{set}$ C, is stored in the memory of the controller.

In an embodiment, two calibration points B and C are determined at a selected and fixed specific Antoine parameter $a_0$.

In an embodiment, the method further comprises the steps of:
Bringing a saturated temperature (Tsat) and a suction temperature (Tsuc) to a stable state where a difference between saturated temperature ($T_{sat}$) and suction temperature ($T_{suc}$) shows a temperature change being ≤0.1° C./min by increasing opening degree of the expansion valve and/or reducing speed of the one or more evaporator fans;
Operating the system for a period of time being between 10 sek and 10 minutes;
Storing values from pressure sensor Psuc and temperature sensor Tsuc in the controller memory; and
Bringing back the opening degree of the expansion valve and/or speed of the one or more evaporator fans to normal operation.

In an embodiment, the steps of the method are carried out when one or more of following conditions are met:
difference between temperature of returning air from cargo space to the evaporator $T_{ret}$ and temperature of supplied air $T_{sup}$ from the evaporator to the cargo space is between −1.5° C. and +1.5° C.;
temperature of returning air $T_{ret}$ from the cargo space to the evaporator is within 0.75° C. from set-point temperature $T_{set}$ of the controller; and
rotating speed of the compressor and/or fans has not altered more than ±5% within last 15 minutes.

This can be done by determining proportion of R134a in relation to refrigerant in the refrigeration system by evaluation where a new Antione parameter $a_1$ measured is compared to $a_1$ of R134a.

In an embodiment, the method further comprises readout of a result in a display,
showing "R134a" if a proportion of R134a in the refrigerant in the system is between 100% and 60%;
showing "R513A" if a proportion of R134a in the refrigerant in the system is between 60% and 40%; and
showing "R1234yf" if a proportion of R134a in the refrigerant in the system is between 40% and 0%.

It is also an object to provide a controller configured to control the method according to one or more of the embodiments.

Calibrating of sensors and/or transmitters will diminish or even eliminate influence from tolerances in the sensors and/or transmitters.

A further object of the invention is to provide a cooling machine in a reefer container e.g. a truck, a railway container, an intermodal container or a shipping container comprising a refrigeration system where the controller is configured to control the method according to one or more of the above embodiments.

Figure 2:
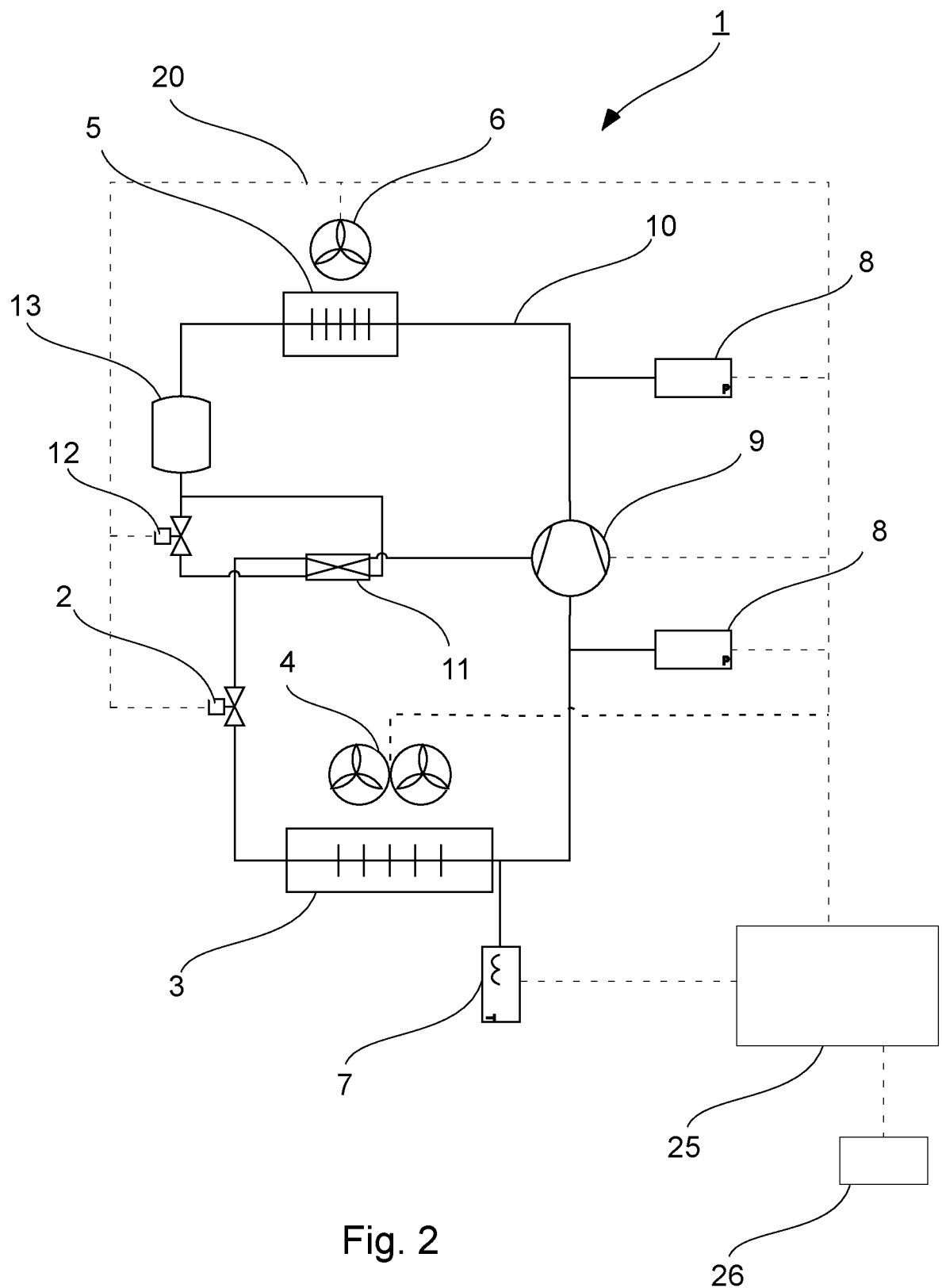
Figure 3:
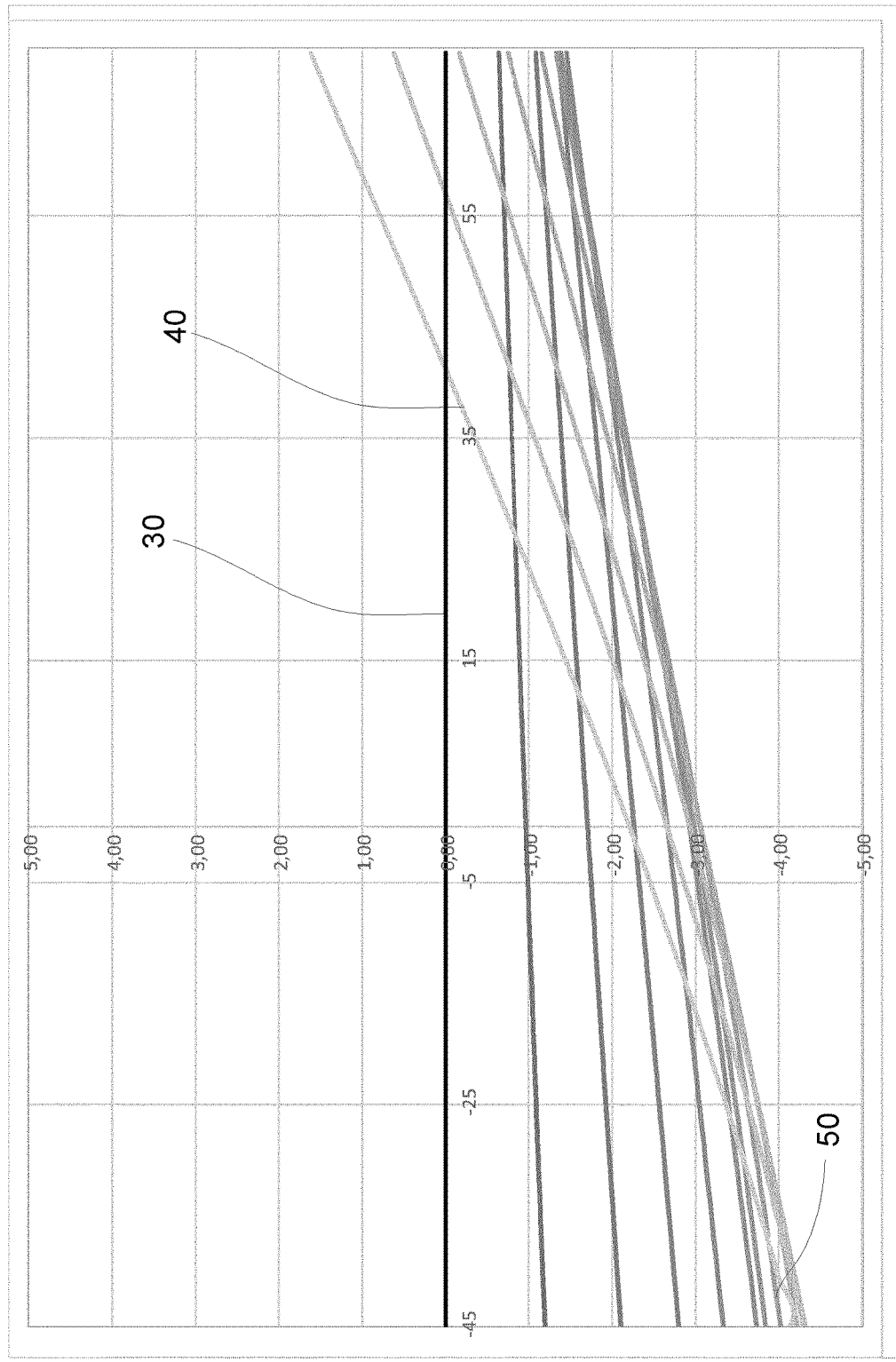
Figure 4:
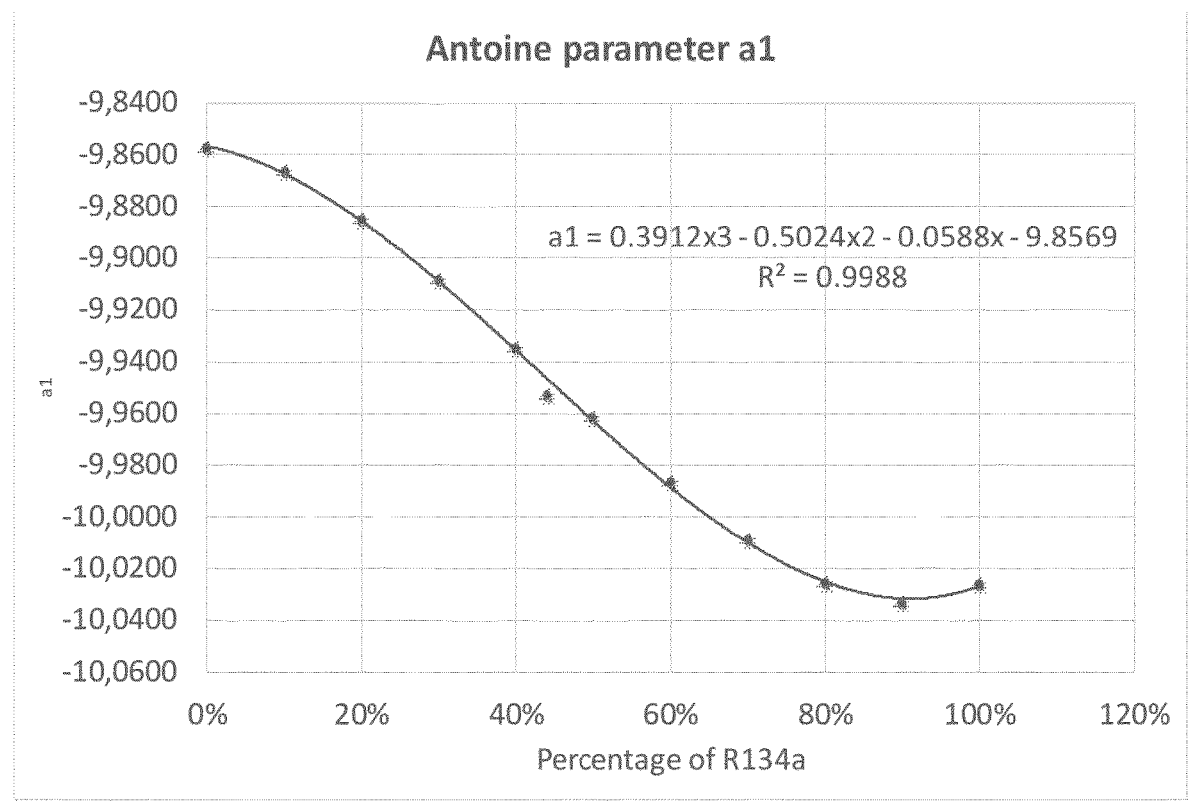

The above and other features and advantages of the present invention will become readily apparent to those skilled in the art by the following detailed description of exemplary embodiments thereof with reference to the attached drawings, in which:

FIG. 1 schematically shows a vapour compression cycle in a refrigeration system;
FIG. 2 shows a simplified diagram of an economized vapour compression cycle, as used in reefer containers;
FIG. 3 shows a variety of R134a-R1234yf blends, compared to saturation temperature of pure R134a; and
FIG. 4 illustrates a curve fit of concentration of R134a in R134a-R1234yf mixtures.

Various embodiments are described hereinafter with reference to the figures. Like reference numerals refer to like elements throughout. Like elements will, thus, not be described in detail with respect to the description of each figure.

It should also be noted that the figures are only intended to facilitate the description of the embodiments.

They are not intended as an exhaustive description of the claimed invention or as a limitation on the scope of the claimed invention. In addition, an illustrated embodiment needs not have all the aspects or advantages shown.

An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

A vapour compression cycle in a refrigeration system 1 is shown in FIG. 1.

The refrigeration system 1 comprises an expansion valve 2, an evaporator 3, one or more evaporator fans 4, a condenser 5, one or more condenser fans 6, one or more temperature sensors 7, one or more pressure sensors 8, a compressor 9, and a controller 25 for controlling the refrigeration system 1, the controller 25 comprising a memory 26, the expansion valve 2, the evaporator 3 and the compressor 6 being fluidly interconnected in a refrigerant path 10 having refrigerant flowing therein.

Signals and data from the sensors 7, 8 are processed in the controller 25. The controller 25 is connected to controllable components such as expansion valve 2, evaporator fan or fans 4, condenser fan or fans 6, and compressor 9, in the refrigeration system 1 in order to be controlled by the controller 25. The connection can be a wired connection 20, a wireless connection, Bluetooth or a combination thereof.

A simplified diagram of an economized vapour compression cycle, as used in reefer containers as shown in FIG. 2, where an economizer 11, a further expansion valve 12 and a receiver 13 is incorporated in the refrigerant path 10 between the evaporator 3 and the condenser 5.

A further pressure sensor 8 is placed between the condenser 5 and the compressor 9. The purpose of the economizer 11 is to reduce run time of the compressor 9.

In Equation 1, the general formula of the Antoine equation is shown, with which the saturated temperature of the refrigerant T (in ° C.) can be calculated based on the pressure measurement P (in bar) and the refrigerant specific constants $a_0$, $a_1$ and $a_2$.

$$T = \frac{a_0}{\ln P + a_1} + a_2 \quad \text{(Eq. 1)}$$

Using refrigeration properties and mixture models, such as included in NIST Refprop, it is possible to calculate the specific parameters $a_0$, $a_1$ and $a_2$ for refrigerant and refrigerant mixtures.

FIG. 4 shows an example of a curve fit of concentration of R134a in R134a-R1234yf mixtures for the parameter $a_0$.

Table 1 below shows the parameters $a_0$, $a_1$ and $a_2$ for pure R134a and pure R1234yf and mixtures of these.

TABLE 1

| R134a | R1234yf | $a_0$ | $a_1$ | $a_2$ |
| --- | --- | --- | --- | --- |
| 100% | 0% | −2210.3420 | −10.0261 | −246.8416 |
| 90% | 10% | −2224.8824 | −10.0334 | −249.2322 |
| 80% | 20% | −2229.7848 | −10.0255 | −250.7359 |
| 70% | 30% | −2229.3537 | −10.0088 | −251.7083 |
| 60% | 40% | −2226.2171 | −9.9866 | −252.3733 |
| 50% | 50% | −2222.0962 | −9.9614 | −252.8783 |
| 44% | 56% | −2220.7702 | −9.9528 | −253.0261 |
| 40% | 60% | −2218.2903 | −9.9348 | −253.3296 |
| 30% | 70% | −2215.9917 | −9.9086 | −253.8138 |
| 20% | 80% | −2216.5091 | −9.8849 | −254.4138 |
| 10% | 90% | −2221.4537 | −9.8667 | −255.2192 |
| 0% | 100% | −2232.9291 | −9.8576 | −256.3367 |

The Antoine equation from Equation 1 can be extended with offsets from pressure and temperature sensors 7, 8, as shown in Equation 2

$$T = \frac{a_0}{\ln(P \cdot P_{offset}) + a_1} + a_2 + T_{offset} \quad \text{(Eq. 2)}$$

By rearranging the equation and introducing variables k in Equation 3 and j in Equation 4 it can be seen that calculating the saturated temperature from the measured pressure can be done from three parameters ($a_0$, j and k) as shown in Equation 5.

$$k = a_2 + T_{offset} \quad \text{(Eq. 3)}$$

$$l = \ln(P_{offset}) + a_1 \quad \text{(Eq. 4)}$$

$$T = \frac{a_0}{\ln(P) + j} + k \quad \text{(Eq. 5)}$$

To determine the parameters $a_0$, j and k, a calibration point for each parameter is needed.

During calibration, it needs to be ensured that the refrigerant is present in two-phase state, i.e. liquid and vapour refrigerant existing at the same time in the location of temperature and pressure measurement, as this ensures that the measured pressure and temperature correspond to each other.

Ensuring the refrigerant to be present in two-phase state can be done by opening of the expansion valve more than in normal operation and/or increasing compressor speed and/or decreasing evaporator fan speed.

The temperature of these calibration points needs to be carefully selected, and depends on the characteristics on pressure transmitter, temperature sensor and refrigerant.

As described above, the temperature of the extended Antoine equation is expressed in ° C., so one calibration point may be selected at 0° C.

This condition can for instance be achieved by defrosting an iced-up evaporator by air (fans are running but defrost heaters and hot gas defrost are inactive). By opening the expansion valve for a limited period (e.g. one minute), liquid refrigerant from the high-pressure side of the refrigeration system flows into the evaporator and temperature and pressure can be recorded for a period of time. The period of time can be from a few seconds to a couple of minutes, for example between 30 seconds and 2 minutes, preferably about 1 minute or for a longer period, for example up to 10 minutes. The period of time should be determined to form a known value and long enough to give a sufficient amount of readings (logging).

Advantages in relation to this condition are that having T=0° C., Equation 5 simplifies to:

$$k = \frac{-a_0}{\ln(P) + j};$$ (Eq. 6)

and temperature sensors are generally most accurate at 0° C., i.e. $T_{offset}$ is minimal.

The offset of the pressure transmitter is typically expressed in percentage of full scale, which means that the pressure reading becomes more accurate towards high pressure levels and less accurate towards low pressure levels.

A first calibration point is then selected to be at e.g. 0° C.

A second calibration point should therefore be selected at a pressure level as high as possible in the refrigeration system, while ensuring refrigerant is present in liquid and vapour state.

A suitable second calibration point is e.g. +20° C. when the refrigeration system has not been operating for some time. By opening the expansion valve for a limited period (e.g. one minute), liquid refrigerant from the high-pressure side of the refrigeration system flows into the evaporator and temperature and pressure can be recorded for e.g.10 minutes.

A third calibration point could be selected at lowest possible temperature achievable with the refrigeration system, e.g. −20° C. or −40° C., as the difference between saturation temperature of R134a and R1234yf is at its largest. The refrigeration system shall control the temperature stable to the lowest possible temperature and increase opening of the expansion valve by 5-20% more than required normally for a period of time. This higher opening will ensure, that the compressor is not damaged by returning liquid refrigerant during the calibration period.

The lowest possible temperature depends on current design of a refrigeration system. In NIST Refprop version 9.1, the equation of state is applicable to −53.15° C. for R1234yf and −103.3° C. for R134a. The lowest possible temperature shall therefore be found between −53.15° C. and −103.3° C. It is obvious that newer research data and/or new versions of NIST Refprop will provide for even lower temperatures.

An example of carrying out a three point calibration can be as follows:

To carry out the three point calibration, default refrigerant parameters is stored in the controller memory 26.

Refrigerant parameters for the refrigerants R134a, R513A and R1234yf are listed in table 2.

TABLE 2

Default Refrigerant parameters stored in controller

| Refrigerant | $a_0$ | $a_1$ | $a_2$ |
|---|---|---|---|
| R134a | −2210.3420 | −10.0261 | −246.8416 |
| R513A | −2220.7702 | −9.9528 | −253.0261 |
| R1234yf | −2232.9291 | −9.8576 | −256.3367 |

Prior to performing a three-point calibration (to compensate Temperature and Pressure deviations, as well as (to compensate for (un)intentional mixing of refrigerants, the default values of $a_0$, $a_1$ and $a_2$ for R134a are used.

Even though use of default values of $a_0$, $a_1$ and $a_2$ for R134a may not result in the most energy efficient operation of the refrigeration system, this will ensure that the refrigeration system 1 can be controlled safely and compressor breakdown due to liquid flooding is prevented.

With the parameters $a_0$, $a_1$ and $a_2$ and the measurement of a pressure at the evaporator 3, the saturated temperature can be determined by use of equation (1)

$$T = \frac{a_0}{\ln P_{suc} + a_1} + a_2$$ (Eq. 1)

An example of a variety of R134a-R1234yf blends, compared to saturation temperature of pure R134a is illustrated in FIG. 3, where 100% R134a is represented by a line 30 being horizontal and 100% R1234yf is represented by a line 40 being most inclining and 100% R513A is represented by a line 50 having an inclination being in between A and B.

The rest of the lines represents mixtures of R134a and R1234yf in compositions from 0.1:0.9 to 0.9:0.1 of the two refrigerants.

It should be noted that R513A is a mix of 56% R1234yf and 44% R134a.

The so computed saturated temperature of the refrigerant can be subtracted from the suction temperature to determine the degree of Superheat (SH), as shown in equation (2).

$$SH = T_{suc} - T_0$$ (Eq. 2)

Presence of Superheat [unit: Kelvin] ensures, that only gaseous refrigerant is returned to the compressor 9. The lower the superheat degree, the more efficient the refrigeration system 1 operates, due to higher suction density (i.e. higher mass flow rate) and better heat transfer in evaporator 3 (i.e. higher suction temperature).

Low levels of Superheat increases risk of liquid droplets or liquid flooding, being a source to erroneous measurement (Temperature sensor offset, Pressure sensor offset, Refrigerant mixture) or suboptimal sensor placement.

The temperature sensor is placed on an outside of a tube. In case the temperature sensor is placed after a bend, then the refrigerant flow is not stratified and exposed all the time to either gaseous or liquid refrigerant. In e.g. a straight line, the flow will be stratified and exposed to either gaseous or liquid refrigerant, subject to operational condition of the unit and flow characteristics in the system.

Physically it is not possible to achieve a lower suction temperature than saturated temperature (negative Superheat) in the presence of vapour. Any similar reading is due to the already stated offsets on Temperature and Pressure measurement and/or mixing of refrigerants.

To perform the three-point calibration, the refrigeration system have to be controlled at three distinct operation points:
  A. Box Temperature: −20° C.±10° C.
  B. Box Temperature: 0° C.±10° C.
  C. Box Temperature: 10° C. or higher
  Where Box Temperature (Tbox) is defined as the set-point temperature Tset.

Following description of how the calibration is performed is identical for operation Points A, B and C:
  i) The controller 25 shall operate the unit to be running stable at first of the calibration points. As stability criteria, different definitions can be applied. Examples can be:
    a. Difference between the temperature sensor 7, measuring temperature of returning air from cargo to the evaporator 3 and the temperature sensor 7, measuring supplied air from the evaporator 3 to the cargo is between −1.5 K and +1.5 K.

b. The temperature sensor 7, measuring the returning air from the cargo to the evaporator 3 is within 0.75 K from set-point temperature stored in the controller 25.

c. Rotating speed of compressor 9 and or fans 4, 6 has not altered more than ±5% within last 15 minutes.

ii) In order to perform the calibration, the saturated temperature and suction temperature need to be brought to equality, this is done by ensuring liquid refrigerant is present for a certain amount of time at the location of the temperature sensor 7 Tsuc. Physically, this can be done by excessively increasing the opening degree of the expansion valve 2, to allow more refrigerant to pass through the evaporator 3 than can be evaporated. In an embodiment, the expansion valve 2 can be an electronic expansion valve.

Alternatively (or in combination) speed of the evaporator fan or fans 4, 6 can be reduced to lower an amount of heat (from the air) present at the evaporator 3 to evaporate all liquid refrigerant.

iii) The refrigeration system 1 needs to operate for a certain, but limited amount of time, to allow for this equalization of temperatures to occur. The time may not be excessively long, as during this process, liquid refrigerant is returned to the compressor 9, which will dilute oil and reduce lubrication between moving parts within the compressor 9, and increase the risk for liquid droplet entering a compression chamber in the compressor 9 and damage discharge reed valves (or con rod), due to the liquid droplets being incompressible.

iv) After the equalization time (ii) has passed, values for the pressure measurement Psuc and the temperature measurement Tsuc are stored in the controller memory 26.

v) Bringing back the system to normal operation (normal fan speed and/or normal expansion valve opening degree), the refrigeration unit controller 25 changing the set-point temperature to reach the next calibration point.

vi) When no more calibration is necessary, return to normal operation.

After performing the above calibration routine in points A, B and C the following information has been stored in the controller memory 26:

TABLE 3

| Calibration Point | Tsuc | Psuc |
|---|---|---|
| A (Box Temperature: −20° C. ± 10° C.) | $T_{suc,A}$ | $P_{suc,A}$ |
| B (Box Temperature: 0° C. ± 10° C.) | $T_{suc,B}$ | $P_{suc,B}$ |
| C (Box Temperature: 10° C. or higher) | $T_{suc,C}$ | $P_{suc,C}$ |

The values of Tsuc from table 3 are set equal with $T_0$ from equation (1), which means that in equation (2) SH is equal to zero (which was the purpose of excessively opening the expansion valve/reducing the fan speed. Based hereon, following three equations can be formulated:

$$T_{suc,A} = \frac{a_0}{\ln P_{suc,A} + a_1} + a_2 \quad \text{(Eq. 3)}$$

$$T_{suc,B} = \frac{a_0}{\ln P_{suc,B} + a_1} + a_2 \quad \text{(Eq. 4)}$$

$$T_{suc,C} = \frac{a_0}{\ln P_{suc,C} + a_1} + a_2 \quad \text{(Eq. 5)}$$

Where $a_0$, $a_1$ and $a_2$ are identical in equation (3), (4) and (5). Having these three equations, it is possible to solve the three unknown parameters $a_0$, $a_1$ and $a_2$:

Equation (3) reformulated:

$$a_2 = T_{suc,A} - \frac{a_0}{\ln P_{suc,A} + a_1} \quad \text{(Eq. 6)}$$

Equation (6) inserted in equation (4):

$$T_{suc,B} = \frac{a_0}{\ln P_{suc,B} + a_1} + T_{suc,A} - \frac{a_0}{\ln P_{suc,A} + a_1} \quad \text{(Eq. 7)}$$

and solved for $a_0$:

$$a_0 = \frac{(T_{suc,B} - T_{suc,A}) \cdot (\ln P_{suc,B} + a_1) \cdot (\ln P_{suc,A} + a_1)}{-\ln P_{suc,B} + \ln P_{suc,A}} \quad \text{(Eq. 8)}$$

Equation (6) and (8) inserted in equation (5)

$$T_{suc,C} = \frac{(T_{suc,B} - T_{suc,A}) \cdot \frac{(\ln P_{suc,B} + a_1) \cdot (\ln P_{suc,A} + a_1)}{-\ln P_{suc,B} + \ln P_{suc,A}}}{\ln P_{suc,C} + a_1} + T_{suc,A} - \frac{(T_{suc,B} - T_{suc,A}) \cdot (\ln P_{suc,B} + a_1) \cdot (\ln P_{suc,A}}{\ln P_{suc,A} + a_1} \quad \text{(Eq. 9)}$$

and solved for $a_1$:

$$a_1 = \frac{k - \sqrt{l}}{m} \quad \text{(Eq. 10)}$$

with k being equal to $k = T_{suc,C} \cdot \ln P_{suc,B} \cdot \ln P_{suc,C} - \ln P_{suc,A} \cdot T_{suc,C} \cdot \ln P_{suc,C} + \ln P_{suc,A} \cdot T_{suc,C} \cdot \ln P_{suc,B} - (\ln P_{suc,A})^2 \cdot T_{suc,C} + \ln P_{suc,A} \cdot T_{suc,A} \cdot \ln P_{suc,B} + (\ln P_{suc,A})^2 \cdot T_{suc,B} - 2 \cdot \ln P_{suc,A} \cdot T_{suc,A} \cdot \ln P_{suc,B} + 2 \cdot \ln P_{suc,A} \cdot T_{suc,A} \cdot \ln P_{suc,C} - T_{suc,B} \cdot \ln P_{suc,B} \cdot \ln P_{suc,C} - \ln P_{suc,A} \cdot T_{suc,B} \cdot \ln P_{suc,C}$  (Eq. 11)

with l being equal to:

$$l = p^2 - 4 \cdot q \cdot r \quad \text{(Eq. 12)}$$

$p = -T_{suc,C} \cdot \ln P_{suc,B} \cdot \ln P_{suc,C} + \ln P_{suc,A} \cdot T_{suc,C} \cdot \ln P_{suc,C} - \ln P_{suc,A} \cdot T_{suc,C} \cdot \ln P_{suc,B} + (\ln P_{suc,A})^2 \cdot T_{suc,C} - \ln P_{suc,A} \cdot T_{suc,A} \cdot \ln P_{suc,B} - (\ln P_{suc,A})^2 \cdot T_{suc,B} + 2 \cdot \ln P_{suc,A} \cdot T_{suc,A} \cdot \ln P_{suc,B} - 2 \cdot \ln P_{suc,A} \cdot T_{suc,A} \cdot \ln P_{suc,C} + T_{suc,B} \cdot \ln P_{suc,B} \cdot \ln P_{suc,C} + \ln P_{suc,A} \cdot T_{suc,B} \cdot \ln P_{suc,C}$ (Eq. 13)

$q = -T_{suc,C} \cdot \ln P_{suc,B} + \ln P_{suc,A} \cdot T_{suc,C} - \ln P_{suc,A} \cdot T_{suc,B} + T_{suc,A} \cdot \ln P_{suc,B} + T_{suc,B} \cdot \ln P_{suc,C} - T_{suc,A} \cdot \ln P_{suc,C}$  (Eq. 14)

$r = -\ln P_{suc,A} \cdot T_{suc,C} \cdot \ln P_{suc,B} \cdot \ln P_{suc,C} + (\ln P_{suc,A})^2 \cdot T_{suc,C} \cdot \ln P_{suc,C} - (\ln P_{suc,A})^2 \cdot T_{suc,B} \cdot \ln P_{suc,B} + \ln P_{suc,A} \cdot T_{suc,B} \cdot \ln P_{suc,B} \cdot \ln P_{suc,C} + (\ln P_{suc,A})^2 \cdot T_{suc,A} \cdot \ln P_{suc,B} - (\ln P_{suc,A})^2 \cdot T_{suc,A} \cdot \ln P_{suc,C}$ (Eq. 15)

with m being equal to $$m = 2 \cdot (-T_{suc,C} \cdot \ln P_{suc,B} + \ln P_{suc,A} \cdot T_{suc,C} - \ln P_{suc,A} \cdot T_{suc,B} + T_{suc,A} \cdot \ln P_{suc,B} + T_{suc,B} \cdot \ln P_{suc,C} - T_{suc,A} \cdot \ln P_{suc,C})$$ (Eq. 16)

From above equations (6), (8), (10) and (11)-(16) it becomes obvious that a three-point calibration is computational extensive. If one parameter ($a_0$, $a_1$ and $a_2$) was kept constant, the calibration would be much simpler, computationally and in that the calibration routine would only need to be performed in two operational points.

TABLE 4

Sensitivity of calculated saturation temperature to parameters $a_0$, $a_1$ and $a_2$

| | | Correct $a_0$, $a_1$, $a_2$ | | | fixing $a_0$ to $a_0$ of R134a | | | fixing $a_1$ to $a_1$ of R134a | | | fixing $a_2$ to $a_2$ of R134a | | |
|---|---|---|---|---|---|---|---|---|---|---|---|---|---|
| R134a | R1234yf | T [° C.] | P [bar] | dT [K] | T [° C.] | P [bar] | dT [K] | T [° C.] | P [bar] | dT [K] | T [° C.] | P [bar] | dT [K] |
| 100% | 0% | 15.8 | 5 | 0.00 | 15.8 | 5 | 0.00 | 15.8 | 5 | 0.00 | 15.8 | 5 | 0.00 |
| 90% | 10% | 14.9 | 5 | 0.00 | 13.2 | 5 | −1.73 | 15.1 | 5 | 0.23 | 17.3 | 5 | 2.39 |
| 80% | 20% | 14.2 | 5 | 0.00 | 11.9 | 5 | −2.31 | 14.2 | 5 | −0.02 | 18.1 | 5 | 3.89 |
| 70% | 30% | 13.7 | 5 | 0.00 | 11.4 | 5 | −2.26 | 13.2 | 5 | −0.55 | 18.6 | 5 | 4.87 |
| 60% | 40% | 13.4 | 5 | 0.00 | 11.5 | 5 | −1.90 | 12.1 | 5 | −1.25 | 18.9 | 5 | 5.53 |
| 50% | 50% | 13.2 | 5 | 0.00 | 11.8 | 5 | −1.41 | 11.1 | 5 | −2.05 | 19.2 | 5 | 6.04 |
| 44% | 56% | 13.1 | 5 | 0.00 | 11.9 | 5 | −1.25 | 10.8 | 5 | −2.32 | 19.3 | 5 | 6.18 |
| 40% | 60% | 13.1 | 5 | 0.00 | 12.2 | 5 | −0.95 | 10.2 | 5 | −2.89 | 19.6 | 5 | 6.49 |
| 30% | 70% | 13.2 | 5 | 0.00 | 12.5 | 5 | −0.68 | 9.5 | 5 | −3.73 | 20.2 | 5 | 6.97 |
| 20% | 80% | 13.4 | 5 | 0.00 | 12.7 | 5 | −0.75 | 8.9 | 5 | −4.49 | 21.0 | 5 | 7.57 |
| 10% | 90% | 13.8 | 5 | 0.00 | 12.5 | 5 | −1.35 | 8.7 | 5 | −5.10 | 22.2 | 5 | 8.38 |
| 0% | 100% | 14.4 | 5 | 0.00 | 11.6 | 5 | −2.74 | 9.0 | 5 | −5.42 | 23.9 | 5 | 9.50 |
| MAX-MIN | | | | 0.00 | | | 2.74 | | | 5.65 | | | 9.50 |

From comparing the correct values of $a_0$, $a_1$ and $a_2$ to fixing $a_0$, $a_1$ and $a_2$ to a meaningful value (within the range of the parameters from Table 2), it can be seen that an incorrect $a_1$ and $a_2$ leads to the largest temperature errors, see Table 4 above. Therefore, it is preferred to fix $a_0$ in the case of a two-point calibration and adjust $a_1$ and $a_2$, but it is certainly possible to fix $a_1$ or $a_2$ and adjust the two remaining parameters.

While in the calculation of Table 4 the respective values of R134a were used, there are other possibilities how to determine the value of this fixed parameter:
 a. Take the average value of $a_0$ from a range between 0% R134a and 100% R134a (rest being R1234yf). Note that R513A is a mix of both at 56% R1234yf and 44% R134a).
 b. Average value of $a_0$ from a range between 10% R134a and 90% R134a (rest being R1234yf), as this improves the calculation for the values within this range (pure R134a and pure R1234yf are outliers).
 c. Set and fix $a_0$ to the last known (and confirmed) value of the refrigerant that was filled in production or under qualified service.
 d. Average value of $a_0$ from a pair of two refrigerants (R134a & R513A; R134a & R1234yf or R513A & R1234yf), as it could be that operators select to only use two of the three possible refrigerants.

The Antoine parameters $a_1$ and $a_2$ are then determined in the two calibration points and $a_0$ is set to $a_{0,fix}$. (Analog procedure should $a_1$ or $a_2$ be fixed). The disbenefit of this approach is a small error in the saturation temperature, should a different refrigerant be used or (un)intentionally mixed.

A further simplification can be to perform a single calibration, i.e. to fix $a_0$ and $a_1$ and adjust $a_2$ to the value obtained from the calibration process. As with the two-point calibration it is also possible here to fix $a_1$ and $a_2$ and adjust $a_0$ or to fix $a_0$ and $a_2$ and fix $a_1$.

TABLE 5

Illustration of preferred storage of calibration parameters in the controller memory 26.

| Refrigerant | $a_0$ | $a_1$ | $a_2$ |
|---|---|---|---|
| R134a | −2210.3420 | −10.0261 | −246.8416 |
| R513A | −2220.7702 | −9.9528 | −253.0261 |
| R1234yf | −2232.9291 | −9.8576 | −256.3367 |
| Fixed value (for 2-point calibration) | $a_{0,fix}$ | — | — |
| Fixed value (for 1-point calibration) | $a_{0,fix}$ | $a_{1,fix}$ | — |
| Values after calibration | $a_{0,cal}$ | $a_{0,cal}$ | $a_{0,cal}$ |
| Temperature measurements during calibration (for point A, B and C) | $T_{suc,A}$ | $T_{suc,B}$ | $T_{suc,C}$ |
| Pressure measurements during calibration (for point A, B and C) | $P_{suc,A}$ | $P_{suc,B}$ | $P_{suc,C}$ |

According to the invention a method is provided for determining a refrigerant or a composition of refrigerants in a refrigeration system 1 comprising an expansion valve 2, an evaporator 3, one or more evaporator fans 4, a condenser 5, one or more condenser fans 6 one or more temperature sensors 7, one or more pressure sensors 8, a compressor 9, and a controller 25 for controlling the refrigeration system 1, the controller 25 comprising a memory 26, the expansion valve 2, the evaporator 3 and the compressor 6 being fluidly interconnected in a refrigerant path 10 having refrigerant flowing therein, comprising the steps of:
 a) Running a test run and read out values from one or more of the sensors 7, 8;
 b) Determining a composition by the result of step a; and
 c) Adjusting the refrigeration system 1 in relation to the composition determined by step b.

This method makes it possible to determine a composition of refrigerant based on table values of Antoine parameters and compared to values from one or more sensors read out from a test run followed by an adjustment or calibration of the refrigeration system 1 in relation to the composition of refrigerant determined by the result of the test run.

In an embodiment, a calibration point A is determined at a set-point temperature $T_{set}$ A, set to 20° C.+/−10° C.

In an embodiment, values of $T_{suc}$ A and $P_{suc}$ A, based on set-point temperature $T_{set}$ A, is stored in the memory 26 of the controller 25.

In an embodiment, a calibration point B is determined at a set-point temperature $T_{set}$ B, set to 0° C.+/−10° C.

In an embodiment, values of $T_{suc}$ B and $P_{suc}$ B, based on set-point temperature $T_{set}$ B, is stored in the memory 26 of the controller 25.

In an embodiment, a calibration point C is determined at a set-point temperature $T_{set}$ C, set to −20° C.+/−10° C.

In an embodiment, values of $T_{suc}$ C and $P_{suc}$ C, based on set-point temperature $T_{set}$ C, is stored in the memory 26 of the controller 25.

In an embodiment, two calibration points B and C are determined at a selected and fixed specific Antoine parameter $a_0$.

In an embodiment, the method further comprises the steps of:
Bringing a saturated temperature ($T_{sat}$) and a suction temperature ($T_{suc}$) to a stable state where a difference between saturated temperature ($T_{sat}$) and suction temperature ($T_{suc}$) shows a temperature change being ≤0.1° C./min by increasing opening degree of the expansion valve 2 and/or reducing speed of the one or more evaporator fans 4;
Operating the system for a period of time being between 10 sek and 10 minutes;
Storing values from pressure sensor $P_{suc}$ and temperature sensor $T_{suc}$ in the controller memory 26; and
Bringing back the opening degree of the expansion valve 2 and/or speed of the one or more evaporator fans 4 to normal operation.

In an embodiment, the steps of the method are carried out when one or more of following conditions are met:
difference between temperature of returning air from cargo space to the evaporator 3 $T_{ret}$ and temperature of supplied air $T_{sup}$ from the evaporator 3 to the cargo space is between −1.5° C. and +1.5° C.;
temperature of returning air $T_{ret}$ from the cargo space to the evaporator 3 is within 0.75° C. from set-point temperature $T_{set}$ of the controller;
rotating speed of the compressor 9 and/or fans 4, 6 has not altered more than ±5% within last 15 minutes.

This can be done by determining proportion of R134a in relation to refrigerant in the refrigeration system by evaluation where a new Antione parameter $a_1$ measured is compared to $a_1$ of R134a.

In an embodiment, the method further comprises readout of a result in a display,
showing "R134a" if a proportion of R134a in the refrigerant in the system is between 100% and 60%;
showing "R513A" if a proportion of R134a in the refrigerant in the system is between 60% and 40%; and
showing "R1234yf" if a proportion of R134a in the refrigerant in the system is between 40% and 0%.

Further, according to the invention is provided a controller 25 for controlling a refrigeration system 1, the controller 25 comprising a memory 26, the refrigeration system 1 comprising a expansion valve 2, an evaporator 3, one or more evaporator fans 4, a condenser 5, one or more condenser fans 6 one or more temperature sensors 7, one or more pressure sensors 8, a compressor 9, the expansion valve 2, the evaporator 3 and the compressor 6 being fluidly interconnected in a refrigerant path 10 having a refrigerant or a composition of refrigerants flowing therein, where the controller 25 is configured to control the method according to one or more of the embodiments of the method.

Further, according to the invention is provided a cooling machine in a reefer container e.g. in a truck, a railway container, an intermodal container or a shipping container, comprising a refrigeration system 1 comprising an expansion valve 2, an evaporator 3, one or more evaporator fans 4, a condenser 5, one or more condenser fans 6 one or more temperature sensors 7, one or more pressure sensors 8, a compressor 9, and a controller 25 for controlling the refrigeration system 1, the controller 25 comprising a memory 26, the expansion valve 2, the evaporator 3 and the compressor 6 being fluidly interconnected in a refrigerant path 10 having refrigerant flowing therein, characterized in that the controller 25 is configured to control the method according to one or more of the embodiments of the method.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense.

The claimed invention is intended to cover all alternatives, modifications and equivalents.

What is claimed is:

1. A method of determining a refrigerant or a composition of refrigerants in a refrigeration system comprising an expansion valve, an evaporator, one or more evaporator fans, a condenser, one or more condenser fans, one or more temperature sensors for measuring at least a suction temperature, one or more pressure sensors for measuring at least a suction pressure, a compressor, and a controller for controlling the refrigeration system, the controller comprising a memory, the expansion valve, the evaporator and the compressor being fluidly interconnected in a refrigerant path having refrigerant flowing therein, and wherein said suction temperature and said suction pressure are measured in the refrigerant path between the evaporator and the compressor, the method comprising the steps of:
   a) running a test run and reading out values from two or more of the sensors;
   b) determining a composition by the result of step a); and
   c) adjusting the refrigeration system in relation to the composition determined by step b),
   wherein step a) comprises controlling the refrigeration system with the controller such that the refrigerant or composition of refrigerants is present in a two-phase state at one or more locations where the suction temperature and suction pressure are measured, and then reading out respective values for the suction temperature and suction pressure, and
   wherein the determining of step b) is based on the refrigerant or composition of refrigerants being present in a two-phase state at said one or more locations where the suction temperature and suction pressure are measured.

2. The method according to claim 1, wherein step a) comprises controlling the refrigeration system in accordance with a set-point temperature Tset A, set to 20° C. +/−10° C., wherein the respective values that are read out for the suction temperature and suction pressure in step a) are based on the set-point temperature $T_{set}$ A, and wherein the method further comprises storing the respective values for the suction temperature and suction pressure in the memory of the controller.

3. The method according to claim 1, wherein step a) comprises controlling the refrigeration system in accordance with a set-point temperature $T_{set}$ B, set to 0° C. +/−10° C., and wherein the respective values that are read out for the suction temperature and the suction pressure in step a) are based on the set-point temperature $T_{set}$ B, and wherein the method further comprises storing the respective values for the suction temperature and suction pressure in the memory of the controller.

4. The method according to claim 1, wherein step a) comprises controlling the refrigeration system in accordance with a set-point temperature $T_{set}$ C, set to −20° C.+/−10° C., wherein the respective values that are read out for the suction temperature and the suction pressure in step a) are based on the set-point temperature $T_{set}$ C, and wherein the method further comprises storing the respective values for the suction temperature and suction pressure in the memory of the controller.

5. The method according to claim 1, wherein two calibration points B and C are determined at a selected and fixed specific Antoine parameter $a_o$.

6. The method according to claim 1, comprising showing a readout of a result on a display, including by:

showing "R134a" if a proportion of R134a in the refrigerant in the system is between 100% and 60%;

showing "R513A" if a proportion of R134a in the refrigerant in the system is between 60% and 40%; and showing "R1234yf if a proportion of R134a in the refrigerant in the system is between 40% and 0%.

7. A controller for controlling a refrigeration system, the controller comprising a memory, the refrigeration system comprising an expansion valve, an evaporator, one or more evaporator fans, a condenser, one or more condenser fans, one or more temperature sensors, one or more pressure sensors, and a compressor, the expansion valve, the evaporator and the compressor being fluidly interconnected in a refrigerant path having a refrigerant or a composition of refrigerants flowing therein, wherein the controller is configured to control the refrigeration system so as to carry out the method according to claim 1.

8. A cooling machine for a reefer container, the cooling machine comprising a refrigeration system comprising an expansion valve, an evaporator, one or more evaporator fans, a condenser, one or more condenser fans one or more temperature sensors, one or more pressure sensors, a compressor, and a controller for controlling the refrigeration system, the controller comprising a memory, the expansion valve, the evaporator and the compressor being fluidly interconnected in a refrigerant path having refrigerant flowing therein, wherein the controller is configured to control the refrigeration system so as to carry out the method according to claim 1.

9. The method according to claim 1, wherein the controlling of the refrigeration system with the controller such that the refrigerant or the composition of refrigerants is present in a two-phase state at the one or more locations where the suction temperature and suction pressure are measured comprises at least one of:

increasing an opening degree of the expansion valve; or reducing a speed of the one or more evaporator fans.

10. The method according to claim 1, wherein step a) comprises operating the refrigeration system according to a first set-point temperature, said respective values that are read out for the suction temperature and the suction pressure in step a) corresponding to said first set-point temperature.

11. The method according to claim 10, wherein the determining of the composition in step b) is based on the respective first values for the suction temperature and suction pressure, and on respective, predetermined values for first and second Antoine parameters.

12. The method according to claim 10, wherein step a) further comprises:

operating the refrigeration system according to a second set-point temperature;

controlling the refrigeration system with the controller such that the refrigerant or composition of refrigerants is present in a two-phase state at the one or more locations where the suction temperature and suction pressure are measured; and reading out respective second values for the suction temperature and suction pressure that correspond to said second set-point temperature.

13. The method according to claim 12, wherein the determining of the composition in step b) is based on the first and second values for the suction temperature and suction pressure, and on a predetermined value for an Antoine parameter.

14. The method of claim 13, wherein the Antoine parameter is $a_o$.

15. The method according to claim 12, wherein step a) further comprises:

operating the refrigeration system according to a third set-point temperature;

controlling the refrigeration system with the controller such that the refrigerant or composition of refrigerants is present in a two-phase state at the one or more locations where the suction temperature and suction pressure are measured; and reading out respective second values for the suction temperature and suction pressure that correspond to said second set-point temperature, wherein the determining of the composition in step b) is based on the first, second and third values for the suction temperature and suction pressure.

16. A method of determining a refrigerant or a composition of refrigerants in a refrigeration system comprising an expansion valve, an evaporator, one or more evaporator fans, a condenser, one or more condenser fans, one or more temperature sensors for measuring at least a suction temperature, one or more pressure sensors for measuring at least a suction pressure, a compressor, and a controller for controlling the refrigeration system, the controller comprising a memory, the expansion valve, the evaporator and the compressor being fluidly interconnected in a refrigerant path having refrigerant flowing therein, and wherein said suction temperature and said suction pressure are measured in the refrigerant path between the evaporator and the compressor, the method comprising the steps of:

a) running a test run and reading out values from two or more of the sensors;

b) determining a composition by the result of step a; and c) adjusting the refrigeration system in relation to the composition determined by step b, wherein the method further comprises the additional steps of:

bringing a saturated temperature and the suction temperature to a stable state, in which a difference between the saturated temperature and the suction temperature exhibits a temperature change with respect to time of less than 0.1° C./min, by increasing an opening degree of the expansion valve and/or reducing a speed of the one or more evaporator fans;

operating the system for a period of time of between 10 seconds and 10 minutes;

storing values from the one or more pressure sensors and the one or more temperature sensors in the controller memory; and bringing back the opening degree of the expansion valve and/or the speed of the one or more evaporator fans to normal operation.

17. The method according to claim 16, wherein said additional steps are carried out when one or more of the following conditions are met:

a difference between a temperature of returning air from a cargo space to the evaporator and a temperature of supplied air from the evaporator to the cargo space is between −1.5° C. and +1.5° C.;

the temperature of returning air from the cargo space to the evaporator is within 0.75° C. from a set-point temperature of the controller;

a rotating speed of the compressor and/or fans has not altered more than +5% within a last 15 minutes.

* * * * *